United States Patent
Yao et al.

(10) Patent No.: US 7,083,078 B2
(45) Date of Patent: Aug. 1, 2006

(54) SYSTEM AND METHOD FOR MANUFACTURE OF A HARD DISK DRIVE ARM AND BONDING OF MAGNETIC HEAD TO SUSPENSION ON A DRIVE ARM

(75) Inventors: Ming Gao Yao, Dongguan (CN); Masashi Shiraishi, Kowloon (HK); Yi Ru Xie, Dongguan (CN)

(73) Assignee: SAE Magnetics (H.K.) Ltd., Shatin (HK)

( * ) Notice: Subject to any disclaimer, the term of this patent is extended or adjusted under 35 U.S.C. 154(b) by 204 days.

(21) Appl. No.: 10/603,444

(22) Filed: Jun. 24, 2003

(65) Prior Publication Data

US 2004/0140342 A1 Jul. 22, 2004

(30) Foreign Application Priority Data

Jan. 20, 2003 (WO) .................... PCT/CN03/00048

(51) Int. Cl.
*B23K 5/22* (2006.01)
(52) U.S. Cl. .................... 228/180.22; 228/212
(58) Field of Classification Search .......... 228/179.1, 228/235.1; 360/245.9, 245.8, 234.5; 29/840
See application file for complete search history.

(56) References Cited

U.S. PATENT DOCUMENTS

| | | | |
|---|---|---|---|
| 3,566,207 A * | 2/1971 | Adams | 257/766 |
| 4,893,403 A * | 1/1990 | Heflinger et al. | 29/840 |
| 5,680,275 A * | 10/1997 | Frater et al. | 360/234.5 |
| 5,699,212 A * | 12/1997 | Erpelding et al. | 360/245.8 |
| 5,754,368 A * | 5/1998 | Shiraishi et al. | 360/245.9 |
| 5,821,494 A | 10/1998 | Albrecht et al. | 219/121.64 |
| 6,215,625 B1 | 4/2001 | Carlson | 360/244.7 |

FOREIGN PATENT DOCUMENTS

| | | |
|---|---|---|
| CN | 1217531 A | 5/1999 |
| CN | 1276602 A | 12/2000 |
| CN | 1281225 A | 1/2001 |

* cited by examiner

*Primary Examiner*—Jonathan Johnson
(74) *Attorney, Agent, or Firm*—Kenyon & Kenyon LLP

(57) ABSTRACT

A system and method are disclosed for the manufacture of a hard disk drive arm and the bonding of magnetic head to suspension on the drive arm.

13 Claims, 9 Drawing Sheets

SYSTEM AND METHOD FOR MANUFACTURE OF A HARD DISK DRIVE ARM AND BONDING OF MAGNETIC HEAD TO SUSPENSION ON A DRIVE ARM

BACKGROUND INFORMATION

The present invention relates to magnetic hard disk drives. More specifically, the invention relates to a system for manufacturing a hard disk drive arm and the bonding of magnetic head to suspension on the drive arm.

Among the better known data storage devices are magnetic disk drives of the type in which a magnetic head slider assembly floats on an air bearing at the surface of a rotating magnetic disk. Such disk drives are often called 'Winchester'-type drives. In these, one or more rigid magnetic disks are located within a sealed chamber together with one or more magnetic head slider assemblies. The magnetic disk drive may include one or more rigid magnetic disks, and the slider assemblies may be positioned at one or both sides of the magnetic disks.

FIG. 1 provides an illustration of a typical hard drive as used in the art. The slider assembly 108 may be mounted in a manner which permits gimbaled movement at the free outer end of the arm 102 such that an air bearing between the slider assembly 108 and the surface of the magnetic disk 104 can be established and maintained. The drive arm 102 is coupled to an appropriate mechanism, such as a voice-coil motor (VCM) 106, for moving the arm 102 across the surface of the disk 104 so that a magnetic head contained within the slider assembly 108 can address specific concentric data tracks on the disk 104 for writing information onto or reading information from the data tracks.

FIGS. 2a–b provide an illustration of a hard drive arm and magnetic head as used in the art. Typically, the magnetic head (slider) 202 is electrically connected to the head gimbal assembly (HGA) by bonding means, such as gold ball bonding (GBB), solder bump bonding (SBB), and ultrasonic welding. Typically, four connection points (balls) 204 are provided to electrically connect the magnetic head 202 to the suspension tongue/head gimbal assembly (HGA) 206. Two of the balls 204 are for the 'read' operation, and two of the balls 204 are for the 'write' operation. To prevent the bonding balls 204 from hardening with the magnetic head 202 in an undesirable orientation, a fixture 208 is used to strongly clamp the suspension tongue 206 and head 202 to be physically stable for ball 204 application by a soldering tool 210, etc. A base support 211 and a first clamping cover 220 stabilize the magnetic head 202. A second clamping cover 221 stabilizes the suspension tongue 206. A second base support (not shown) secures the load beam 212. This fixture 208 is utilized to prevent a change in orientation of the head 202 by the force of the soldering tool 210 during application. However, the clamping force of the fixture 208 is often enough to deform the magnetic head 202 and suspension tongue 212 structure causing improper orientation (alignment). Further, the forces involved have a tendency to damage the head 202 surface as well as the head suspension dimple 214.

It is therefore desirable to have a system to enable magnetic head electrical bonding while avoiding the aforementioned problems, in addition to providing other advantages.

DETAILED DESCRIPTION

Figure 1:
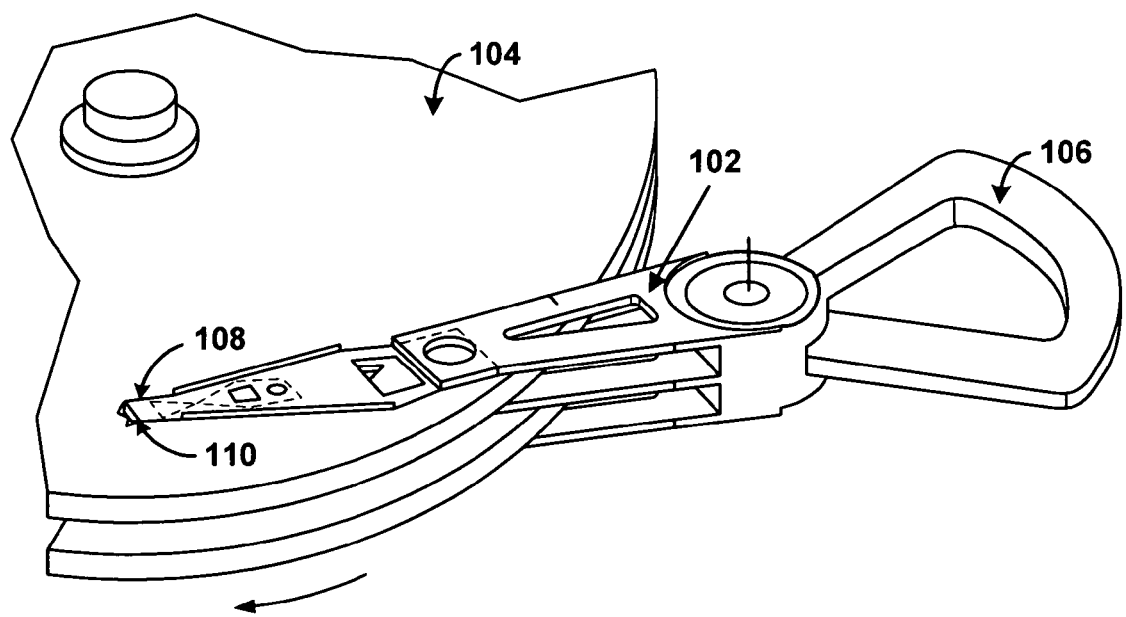
FIG. 1 provides an illustration of a typical hard drive as used in the art.
Figure 2A:
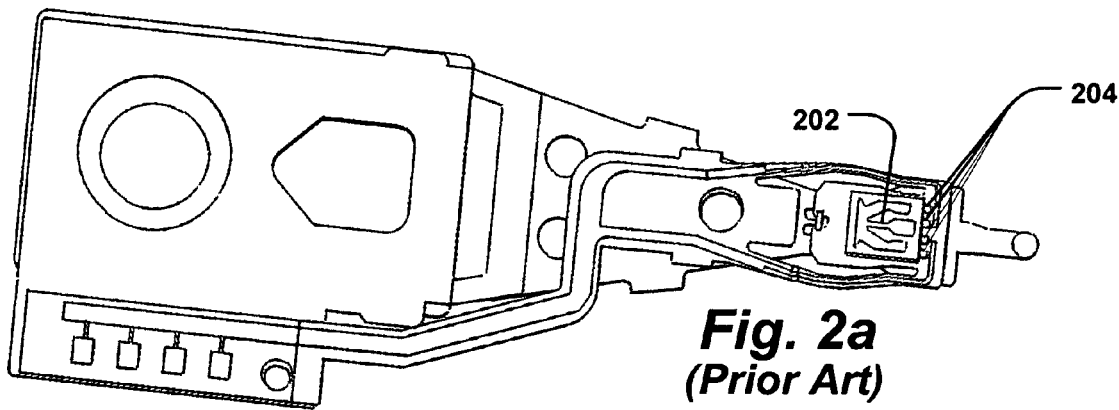
FIGS. 2a–c provide an illustration of a hard drive arm and magnetic head as used in the art.
Figure 2B:
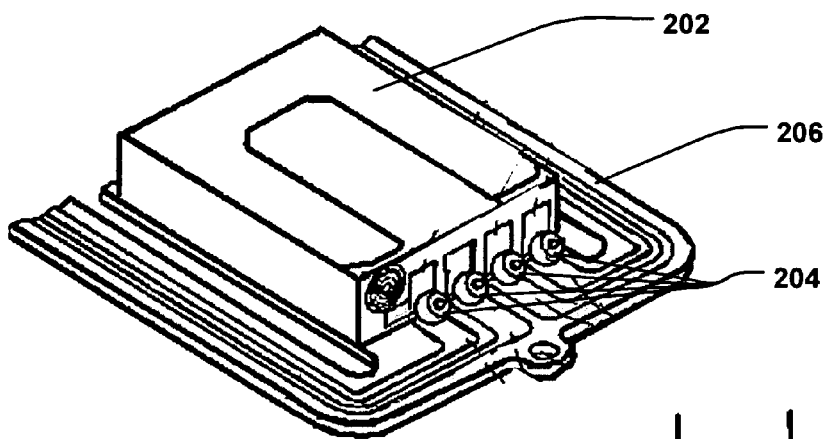
Figure 2C:
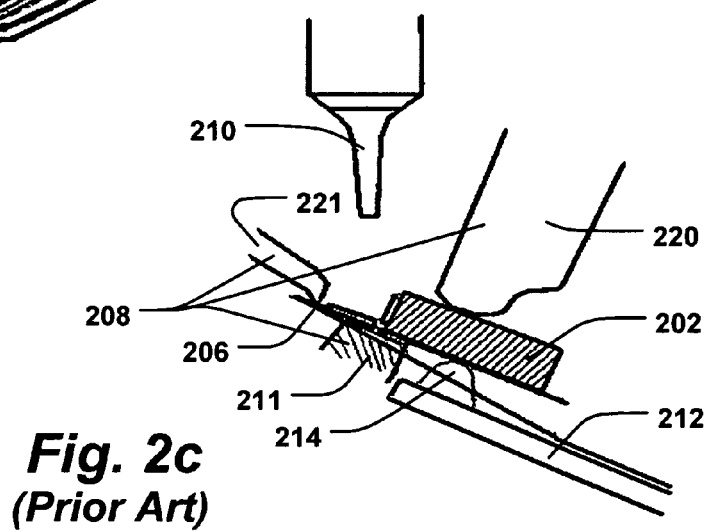
Figure 3A:
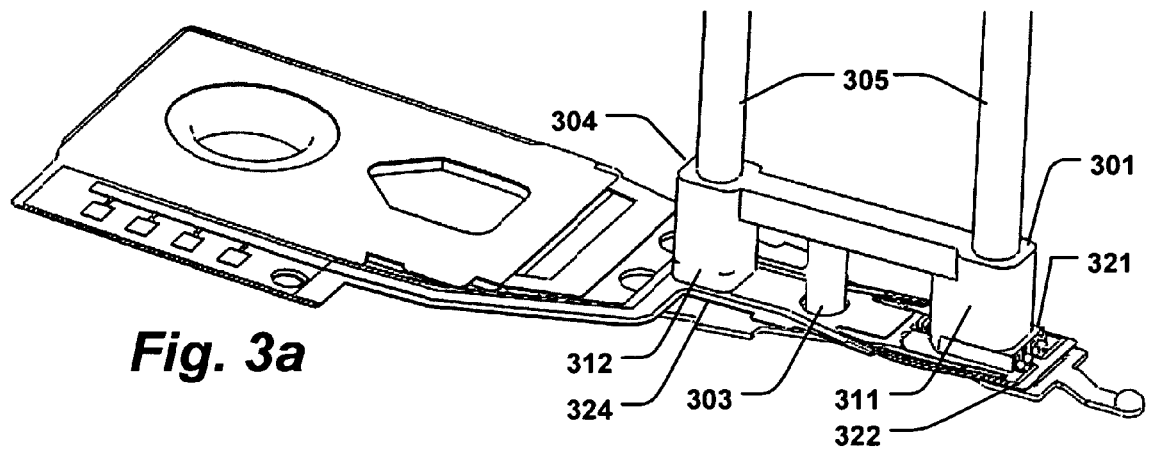
FIGS. 3a–b illustrate a hard drive arm suspension, magnetic head, and head placement device according to an embodiment of the present invention.
Figure 3B:
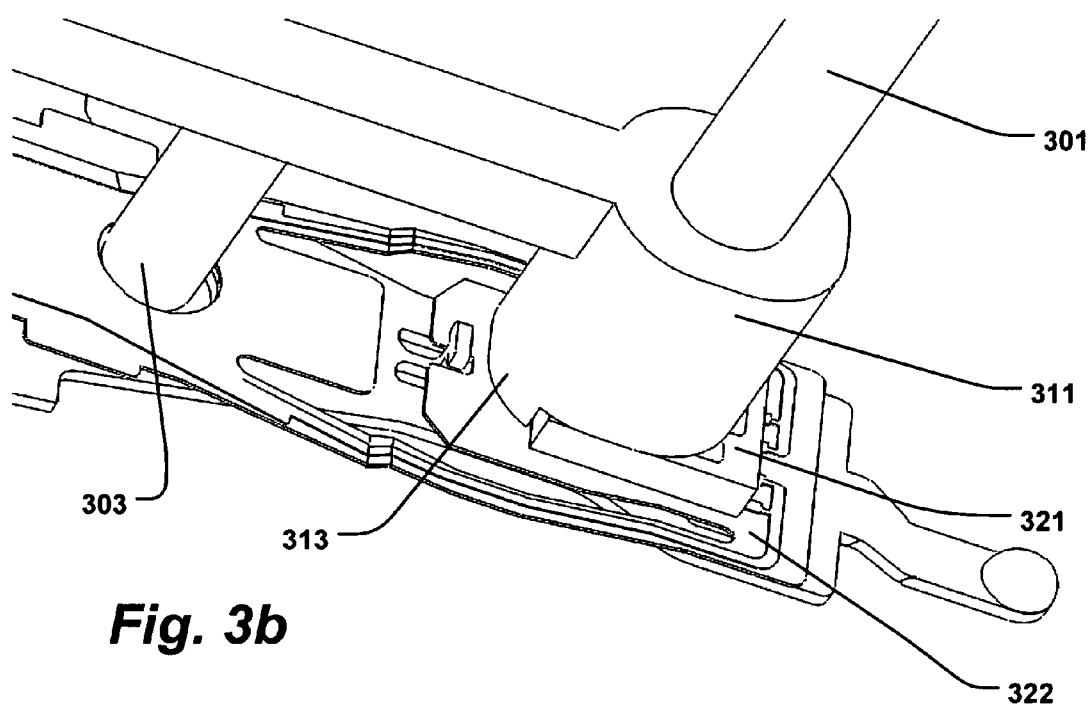
Figure 4A:
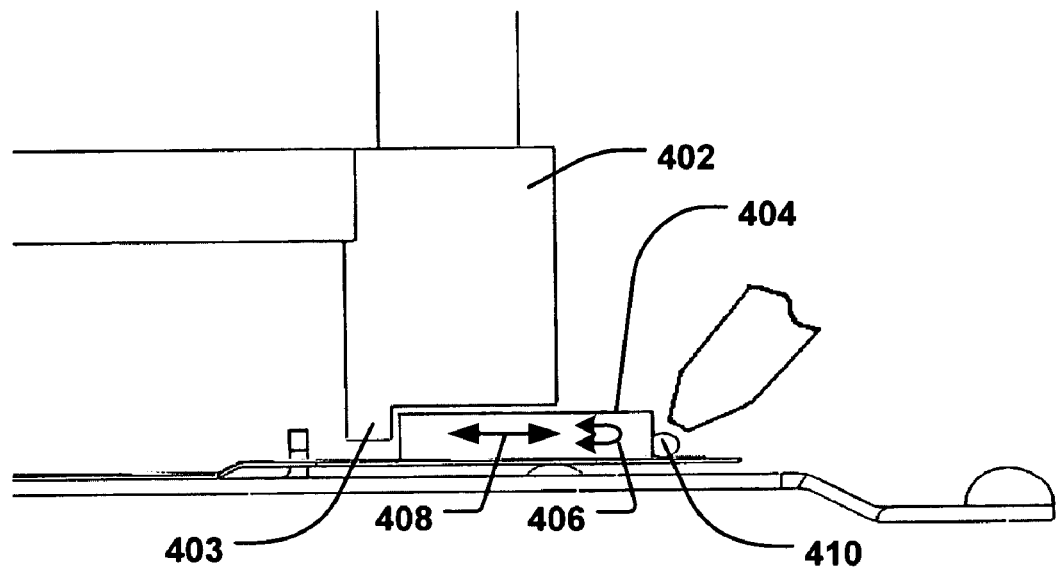
FIGS. 4a–d illustrate placement device design according to two different embodiments of the present invention.
Figure 4B:
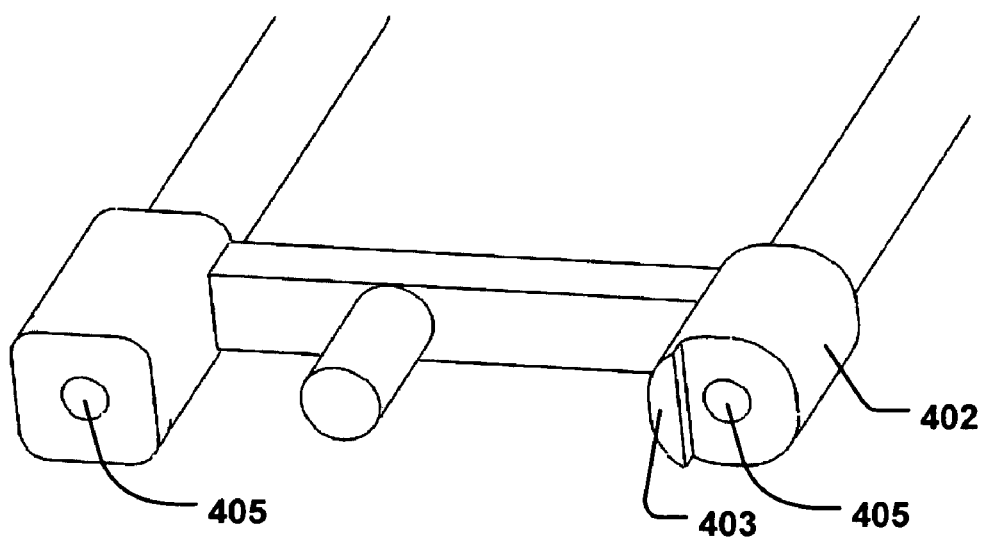
Figure 4C:
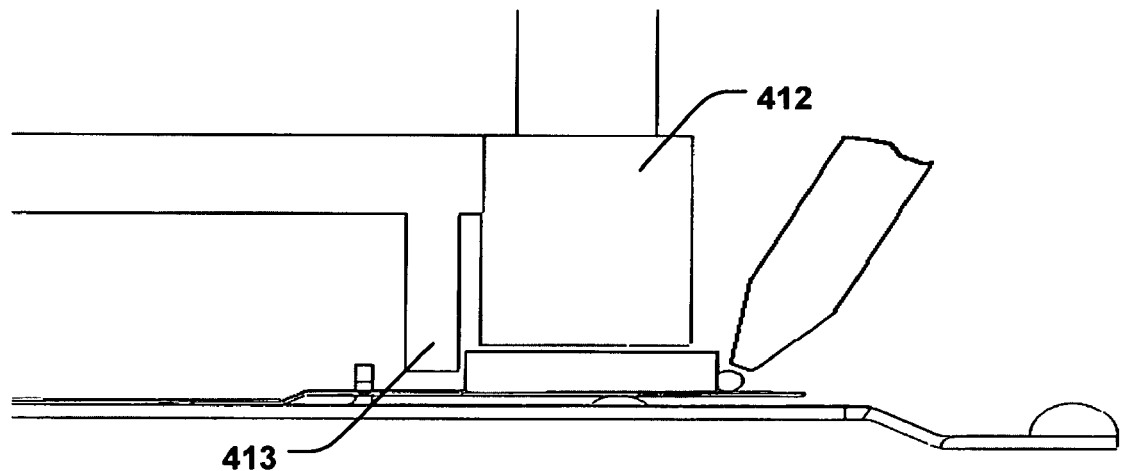
Figure 4D:
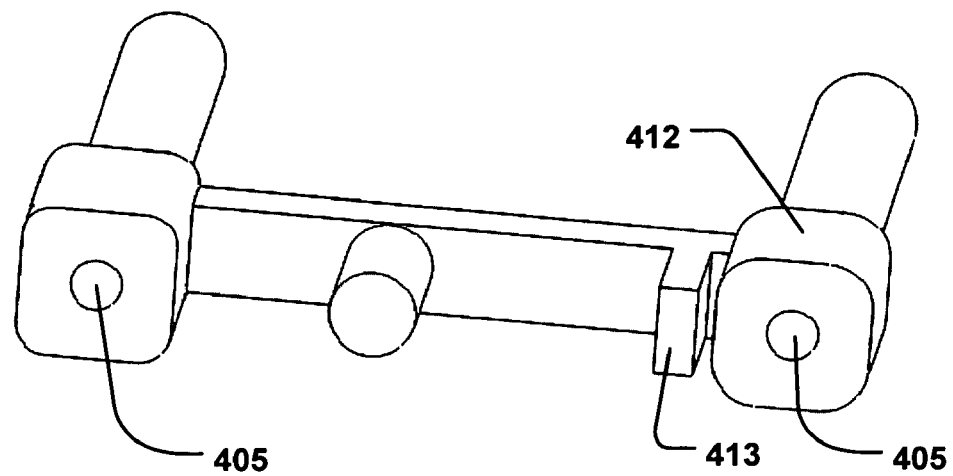
Figure 5A:
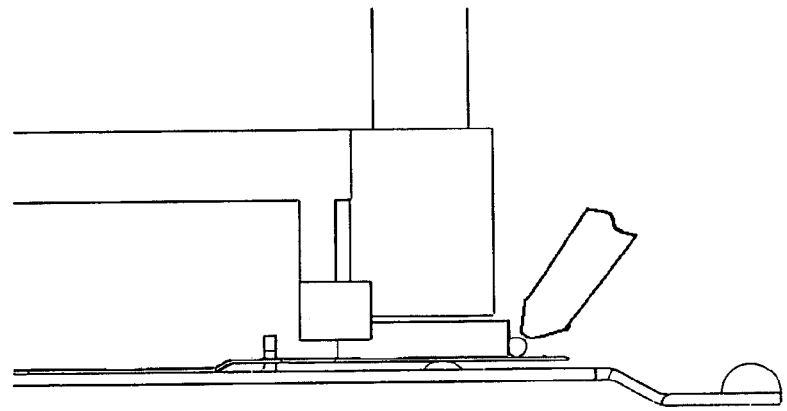
FIGS. 5a–d illustrate placement device design according to three additional embodiments of the present invention.
Figure 5B:
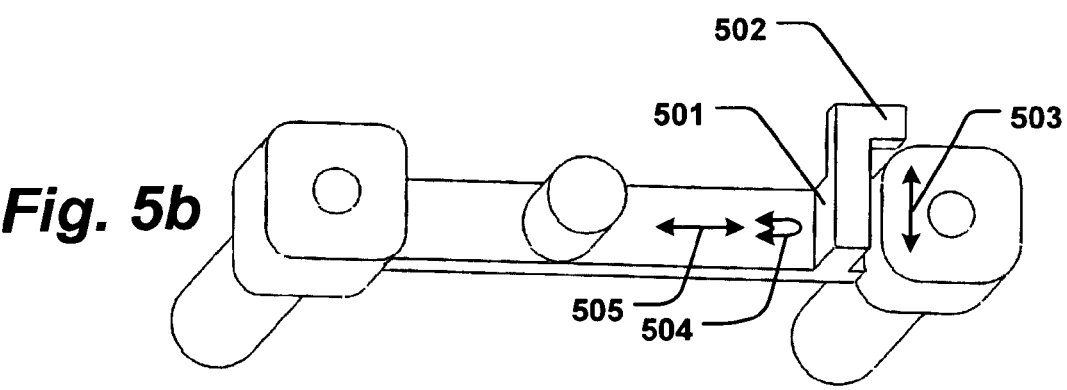
Figure 5C:
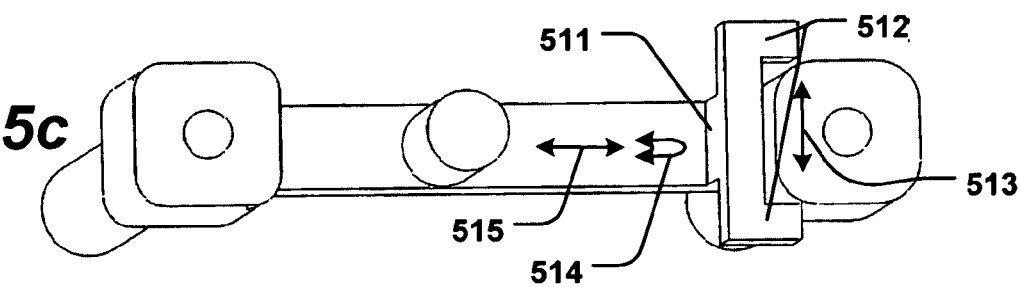
Figure 5D:
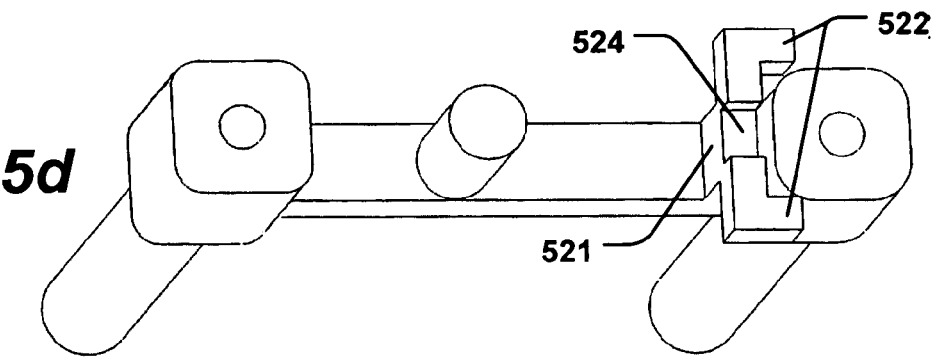
Figure 6A:
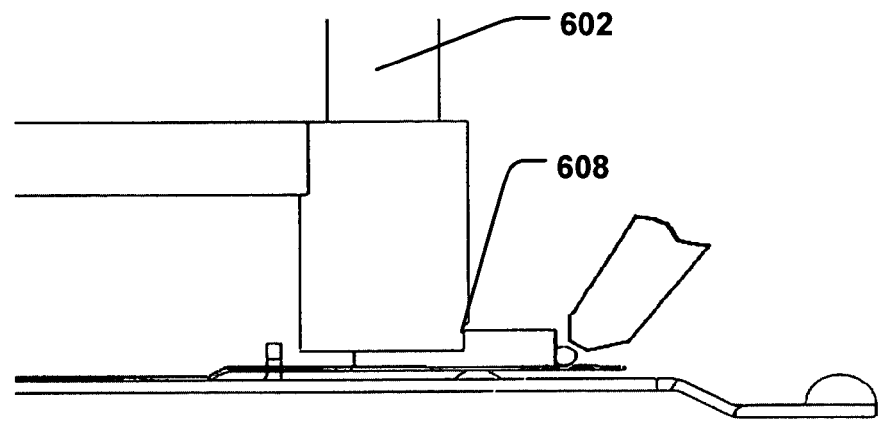
FIGS. 6a–d illustrate placement device design according to three further embodiments of the present invention.
Figure 6B:
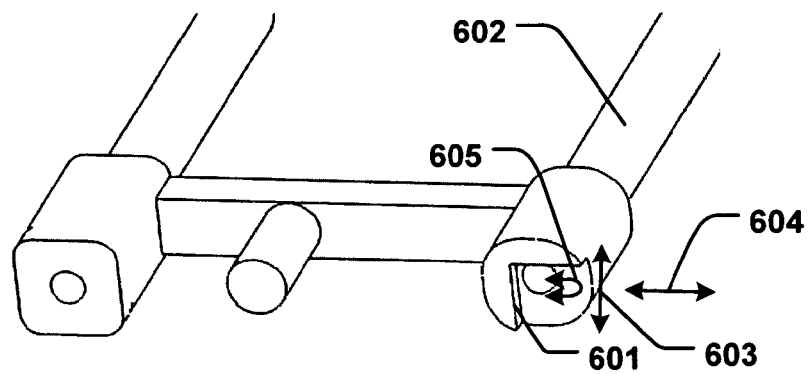
Figure 6C:
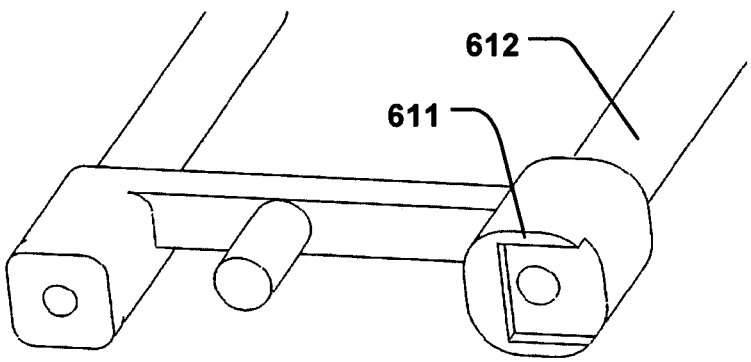
Figure 6D:
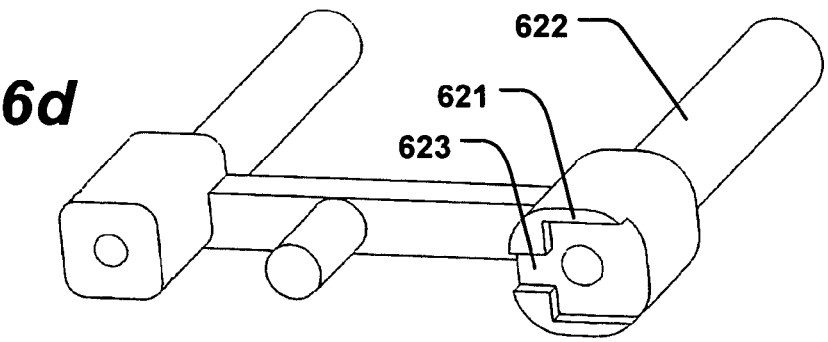

FIG. 3 illustrates a hard drive arm suspension, magnetic head, and head placement device according to an embodiment of the present invention. As shown in FIG. 3a, in one embodiment, the placement device 305 has two vacuum tubes 301,304. The first vacuum pipe (tube) 301 has a fixture 311 that mates to the magnetic head 321 of a hard drive. As shown in FIG. 3b, in this embodiment, the first vacuum tube fixture 311 has a stepped 313 surface that mates with the head 321 in such a way that prevents rotational motion of the head 321 with respect to the placement device 305 (and thus, the suspension tongue 322). In one embodiment, the step 313 is between 100 micrometers and 280 micrometers. In one embodiment, the second vacuum tube has a fixture mate-able to the load beam 324. Further, an alignment pin 303 is provided that is capable of being inserted into the tooling hole of the load beam 324 for ensuring proper alignment. In this embodiment, the placement device is secured to the magnetic head 321 and load beam 324 by sub-ambient pressure imposed by the first 301 and second 302 vacuum tubes, the first vacuum tube 301 applying suction force to the air bearing surface (ABS) of the slider/head 321 and the second vacuum tube 302 applying suction force to the load beam 324.

FIG. 4 illustrates placement device design according to two different embodiments of the present invention. In one embodiment, shown in FIGS. 4a and 4b, the fixture 402 of the first vacuum tube has an integrated step 403 to prevent rotational (yaw) 406 and longitudinal 408 motion of the magnetic head 404 during bonding ball 410 application. In another embodiment, shown in FIGS. 4c and 4d, the fixture 412 of the first vacuum tube has an externally-mounted step structure 413. Further, FIGS. 4b and 4d illustrate the air inlets of the first and second vacuum tubes.

FIG. 5 illustrates placement device design according to three additional embodiments of the present invention. As shown in FIG. 5b, in one embodiment, an externally-mounted step structure 501 is provided with a side protrusion 502 to prevent transverse 503 motion (as well as longitudinal 504 and rotational 505 motion) of the magnetic head 508 (See FIG. 5a). As shown in FIG. 5c, in another embodiment, an externally-mounted step structure 511 is provided with two side protrusions 512 to prevent transverse 513 motion (as well as longitudinal 514 and rotational 515 motion) of the magnetic head 508 (See FIG. 5*a*). As shown in FIG. 5*d*, in yet another embodiment, an externally-mounted step structure 521 is provided with two side protrusions 522. Further, in this embodiment, a notch 524 is provided in the step 521 to allow for arm component clearance.

FIG. 6 illustrates placement device design according to three further embodiments of the present invention. As shown in FIG. 6*b*, in one embodiment, the first vacuum tube 602 has an 'L'-shaped step structure 601 integrated in its mating surface to prevent transverse 603 motion (as well as longitudinal 604 and rotational 605 motion) of the magnetic head 608 (See FIG. 6*a*). As shown in FIG. 6*c*, in another embodiment, the first vacuum tube 612 has a 'U'-shaped step structure 611 integrated in its mating surface. As shown in FIG. 6*d*, in yet another embodiment, the first vacuum tube 622 has a 'U'-shaped step structure 621 integrated in its mating surface with a notch 623 provided to allow for arm component clearance.

Figure 7A:
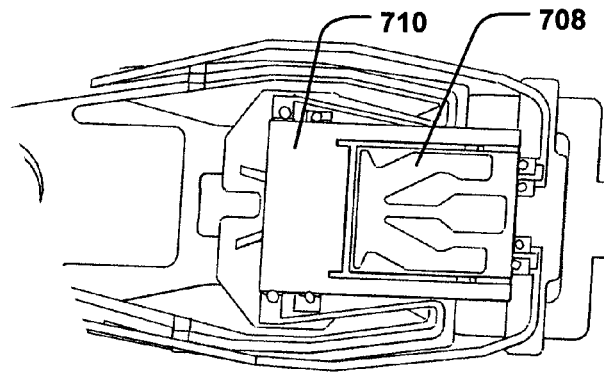
FIGS. 7a–d illustrate placement device design for 'U'-shaped micro-actuator accommodation according to an embodiment of the present invention.
Figure 7B:
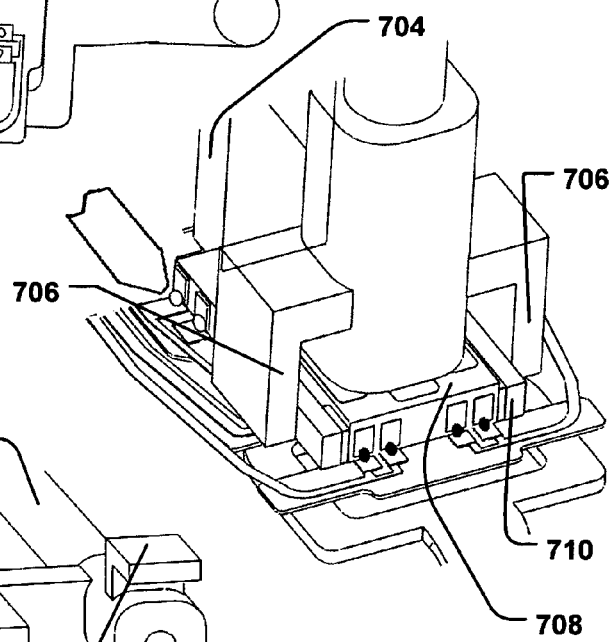
Figure 7C:
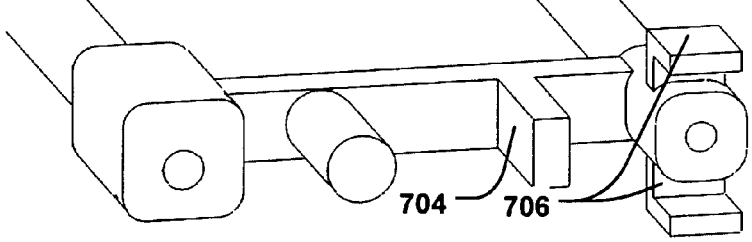
Figure 7D:
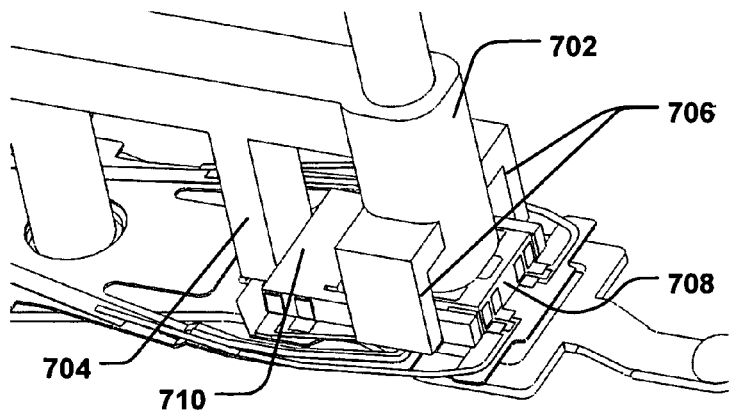

FIG. 7*a* illustrates placement device design for 'U'-shaped micro-actuator accommodation according to an embodiment of the present invention. As shown in FIGS. 7*b*, 7*c*, and 7*d*, in one embodiment, a first vacuum tube 702 has an externally-mounted step 704 and two side-mounted steps 706 to restrict the motion of a magnetic head 708 that is mounted in a micro-actuator, such as a 'U'-shaped micro-actuator 710. This embodiment accommodates the shape of such a micro-actuator 710 while preventing the motion of the head 708 and micro-actuator 710 during the bonding process.

Figure 8:
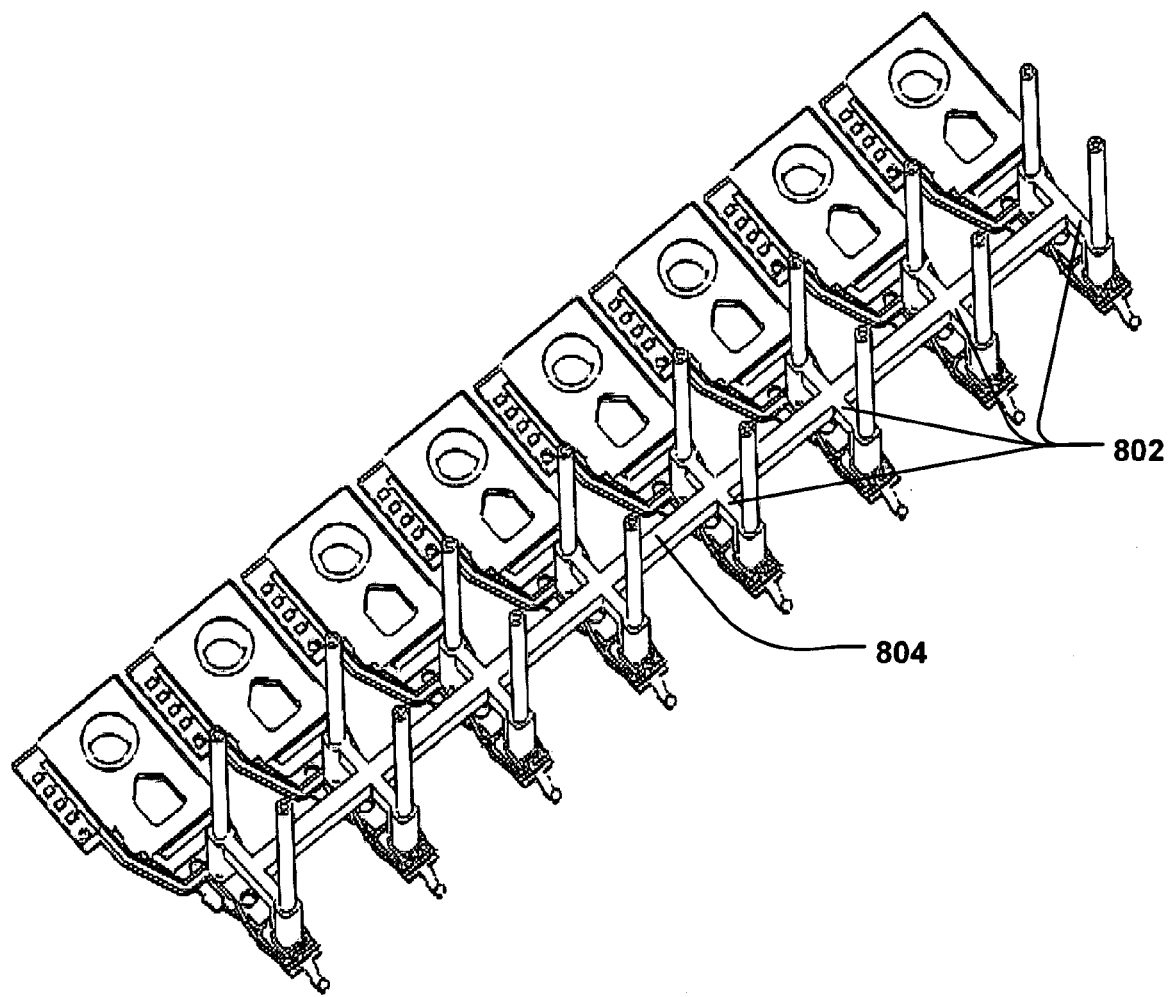
FIG. 8 illustrates the design of a simultaneous operation placement device according to an embodiment of the present invention.

FIG. 8 illustrates the design of a simultaneous operation placement device according to an embodiment of the present invention. In one embodiment, multiple individual placement devices 802 are combined into one machine 804 in order to stabilize components of many hard drive load arms for simultaneous head bonding operations.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A method for manufacturing a data storage device comprising:
    physically stabilizing, by a placement device, a hard drive head device for electrical bonding of said head device to a hard drive arm component;
    physically stabilizing, by the placement device, the hard drive arm component; and
    utilizing, by said placement device, sub-ambient pressure to maintain the position of said head device with respect to said arm component for said electrical bonding.

2. The method of claim 1, wherein said hard drive head device is a hard disk drive magnetic head.

3. The method of claim 2, wherein said hard drive arm component is a suspension tongue.

4. The method of claim 1, wherein said electrical bonding is ball bonding.

5. The method of claim 4, wherein said electrical bonding is a type selected from the group consisting of gold ball bonding (GBB), solder bump bonding (SBB), ultrasonic welding, and stitch bonding.

6. The method of claim 5, wherein said placement device includes a first vacuum tube structure for providing said sub-ambient pressure to affix said first vacuum tube structure to said head device.

7. The method of claim 6, further comprising:
    providing an alignment pin protruding from said placement device.

8. The method of claim 7, wherein said alignment pin is capable of being inserted into a suspension tooling hole for ensuring said proper alignment.

9. The method of claim 7, further comprising:
    providing sub-ambient pressure, by a second vacuum tube;
    vacuum-coupling said first vacuum tube structure to said head device; and
    vacuum-coupling said second vacuum tube structure to a suspension load beam attached to said arm component.

10. The method of claim 9, wherein the first vacuum tube structure includes a step structure mate-able to an edge of the head device.

11. The method of claim 10, wherein said step structure is mate-able to at least the leading edge of said head device.

12. The method of claim 9, wherein said first vacuum tube structure is a material selected from the group consisting of Stainless Steel, Copper, Aluminum Oxide, Polyimide, and Ceramic.

13. The method of claim 9, wherein said second vacuum tube structure is a material selected from the group consisting of Stainless Steel, Copper, Aluminum Oxide, Polyimide, and Ceramic.

\* \* \* \* \*